US 9,878,630 B2

(12) United States Patent
Kaindl et al.

(10) Patent No.: US 9,878,630 B2
(45) Date of Patent: Jan. 30, 2018

(54) DEVICE FOR TRANSMITTING DATA BETWEEN A DATA TRANSMISSION DEVICE OF A VEHICLE AND A DATA TRANSMISSION DEVICE OF A COMMUNICATIONS NETWORK AS PART OF A CHARGING PROCESS OF AN ELECTRICAL ENERGY STORE OF THE VEHICLE

(71) Applicant: Bayerische Motoren Werke Aktiengesellschaft, Munich (DE)

(72) Inventors: Michael Kaindl, Ergoldsbach (DE); Michael Schwaiger, Haar (DE); Christian Jahn, Fraunberg (DE); Harald Thierauf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 303 days.

(21) Appl. No.: 14/859,636

(22) Filed: Sep. 21, 2015

(65) Prior Publication Data
US 2016/0009190 A1 Jan. 14, 2016

Related U.S. Application Data

(63) Continuation of application No. PCT/EP2014/055245, filed on Mar. 17, 2014.

(30) Foreign Application Priority Data

Mar. 22, 2013 (DE) .................. 10 2013 205 088

(51) Int. Cl.
H04B 3/54 (2006.01)
H04L 29/06 (2006.01)
(Continued)

(52) U.S. Cl.
CPC ....... B60L 11/1838 (2013.01); B60L 11/1816 (2013.01); B60L 11/1824 (2013.01);
(Continued)

(58) Field of Classification Search
CPC .............. H04B 3/54; H04B 2203/5425; H04B 2203/5408
(Continued)

(56) References Cited

U.S. PATENT DOCUMENTS 6,104,707 A * 8/2000 Abraham ............ H02J 13/0031
340/12.36
6,396,392 B1 * 5/2002 Abraham ............... H04B 3/542
340/12.33
(Continued)

FOREIGN PATENT DOCUMENTS

DE 10 2009 025 302 A1 12/2010
DE 10 2011 007 912 A1 10/2012
(Continued)

OTHER PUBLICATIONS

International Search Report dated Jun. 11, 2014 (Two (2) pages).
German Search Report dated Jul. 3, 2013, with Statement of Relevancy (Five (5) pages).

Primary Examiner — Samuel Berhanu
Assistant Examiner — Tarikh Rankine
(74) Attorney, Agent, or Firm — Crowell & Moring LLP

(57) ABSTRACT

A device for transmitting data between a data transmission device of a vehicle and a data transmission device of a communications network, as part of a charging process of an electrical energy store of the vehicle, is disclosed. The vehicle data transmission device is based on a first communications protocol with a first signal level, while the communications network data transmission device is based on a second communications protocol with a second signal level. The device includes a signal-matching device having at least (Continued)

one first coupling transformer, which couples a data transmission device of a charging station to the data transmission devices of the vehicle and of the communications network via respective coils. The signal-matching device is configured to match the first signal level to the second signal level and vice versa.

17 Claims, 3 Drawing Sheets

(51) Int. Cl.
  *B60L 11/18* (2006.01)
  *H04B 3/56* (2006.01)
  *H04L 12/28* (2006.01)
  *H04L 12/40* (2006.01)

(52) U.S. Cl.
  CPC .......... *B60L 11/1846* (2013.01); *H04B 3/544* (2013.01); *H04B 3/56* (2013.01); *H04L 12/283* (2013.01); H04B 3/54 (2013.01); H04B 2203/5408 (2013.01); H04B 2203/5458 (2013.01); H04B 2203/5483 (2013.01); H04L 2012/2843 (2013.01); H04L 2012/40273 (2013.01); Y02B 90/2692 (2013.01); Y02T 10/7005 (2013.01); Y02T 10/7072 (2013.01); Y02T 90/121 (2013.01); Y02T 90/128 (2013.01); Y02T 90/14 (2013.01); Y02T 90/16 (2013.01); *Y02T 90/163* (2013.01); *Y02T 90/169* (2013.01); *Y04S 30/14* (2013.01); *Y04S 40/146* (2013.01)

(58) Field of Classification Search
  USPC ................................................. 375/257, 258
  See application file for complete search history.

(56) References Cited

U.S. PATENT DOCUMENTS

| | | | |
|---|---|---|---|
| 8,416,864 B2* | 4/2013 | Korobkov | ............. H04L 1/0007 375/220 |
| 2002/0071531 A1* | 6/2002 | Goodman | ............. H04H 20/81 379/90.01 |
| 2010/0094737 A1* | 4/2010 | Lambird | ................ G06Q 30/04 705/34 |
| 2011/0103274 A1* | 5/2011 | Vavik | ....................... H04B 3/54 370/293 |
| 2011/0109266 A1* | 5/2011 | Rossi | .................. B60L 11/1824 320/109 |
| 2013/0024306 A1* | 1/2013 | Shah | ..................... G06Q 20/32 705/17 |
| 2014/0036989 A1 | 2/2014 | Heinrich et al. | |

FOREIGN PATENT DOCUMENTS

| | | |
|---|---|---|
| EP | 2 437 074 A2 | 4/2012 |
| EP | 2 562 552 A2 | 2/2013 |
| WO | WO 2012/176833 A1 | 12/2012 |
| WO | WO 2012/177812 A1 | 12/2012 |

* cited by examiner

DEVICE FOR TRANSMITTING DATA BETWEEN A DATA TRANSMISSION DEVICE OF A VEHICLE AND A DATA TRANSMISSION DEVICE OF A COMMUNICATIONS NETWORK AS PART OF A CHARGING PROCESS OF AN ELECTRICAL ENERGY STORE OF THE VEHICLE

CROSS REFERENCE TO RELATED APPLICATIONS

This application is a continuation of PCT International Application No. PCT/EP2014/055245, filed Mar. 17, 2014, which claims priority under 35 U.S.C. § 119 from German Patent Application No. 10 2013 205 088.7, filed Mar. 22, 2013, the entire disclosures of which are herein expressly incorporated by reference.

BACKGROUND AND SUMMARY OF THE INVENTION

The invention relates to a device for transmitting data between a data transmission device of a vehicle and a data transmission device of a communication network as part of a charging process of an electrical energy store of the vehicle.

Charging an energy store of an electrically operated vehicle requires an exchange of communication between the vehicle and the charging device. As part of such a communication, status and control values are transmitted which are needed for the technical charging process. Just as well, information can also be transmitted which is needed for paying/accounting for the charging process. Furthermore, value-added services such as, e.g., a flash update of multimedia contents can also be transmitted to and from the vehicle.

It is contemplated to use a digital communication between the vehicle and the charging station for the applications described above. This can be based on power line technology according to ISO 15188 and is known by the term power line communication (PLC). The charging process of electrical vehicles is standardized primarily in ISO 15188. Apart from the purely technical subjects such as controlling the charging process (by specifying e.g. voltages, currents and duration), the accounting process is also the motivation for transmitting vehicle data. Apart from the charging process per se, various targets are pursued such as, e.g., linking to the home networking for Internet, video and Internet radio with very high bandwidths during the charging phase. For the ranges mentioned last, products with power line technology with 14 MBd, 85 MBd or currently 200 MBd are available today commercially. Plannings go beyond 200 MBd. These standards are combined under the term Homeplug Audio/Video (HPAV) in the further text. PLC technology is a transmission technology which uses various modulation methods, e.g. QAM and carrier frequency methods, and can use as transmission medium the power lines (conductor L and neutral conductor N) or any available conductor.

In addition, a method according to the new Homeplug Greenphy 1.1 (HPGP1.1) is planned for the ISO standard ISO 15118. This standard uses from the available Homeplug standards only a restricted subset of features and a restricted bandwidth. The transmission for ISO 15118 is carried out not on a power line but on a separate signal line also used for other purposes (Control Pilot CP) and the protective earth (PE). The signal line CP is used for very simple charging systems and enables a charging process to be controlled in the normal case only with a +/-12V PWM signal with 1 kHz clock rate. This original signal CP, however, is not relevant for the further description.

In HPGP, only those modulation methods are used which are particularly robust against disturbances. The bandwidth is limited to 10 MBd. HPGP operates with up to 1055 carriers in the frequency band from 1.8 MHz to 30 MHz. The design of the HPGP standard is such that Homeplug-compliant PLC methods can communicate with one another guaranteed. HPGP and HPAV can then communicate with one another with maximally 10 MBd or with a guaranteed 7% proportion of the HPGP on a power line occupied by HPAV.

Due to the EMC regulations for vehicles and restrictions in various countries, direct communication between the charging station and the vehicle via a power line is not possible. The PLC communication in ISO 15118 is, therefore, applied on the abovementioned control pilot (CP) signal line. The defined return conductor is the protective earth (PE). Apart from this separation, it is necessary to lower the level of the transmitting power of the PLC modem for ISO 15118 which communicates with the vehicle very widely in order to cause no EMC disturbances in the vehicle itself and environment. It is particularly the demands on the vehicle manufacturers as part of the motor vehicle licensing regulations which play a great role in this case. For this reason, a further router or a gateway is needed in the charging column apart from the PLC modem for ISO 15118, which router or gateway implements communication with the Internet in order to implement bidirectional communication between the vehicle and the Internet.

A charging station which has an HPGP modem and the logical coupling with an HPAV modem previously required the expenditure of two complete modems and corresponding logic for coupling between the two modems with respect to signals, e.g. by means of a control computer. The charging station becomes technically elaborate and expensive, as a result.

It is the object of the present invention to specify a device for transmitting data between a data transmission device of a vehicle and a data transmission device of a communication network as part of a charging process of an electrical energy store of the vehicle, which device is constructionally and/or operationally improved.

This object is achieved by a device according to the features of patent claim 1. Advantageous embodiments are obtained from the dependent patent claims.

A device for transmitting data between a data transmission device of a vehicle and a data transmission device of a communication network as part of a charging process of an electrical energy store of the vehicle is proposed, the vehicle data transmission device being based on a first communication protocol having a first signal level and the communication network data transmission device being based on a second communication protocol having a second signal level. The device comprises a signal matching device with at least one first coupling transformer which, via respective coils, couples a data transmission device of a charging station with the data transmission devices of the vehicle and of the communication network with one another, the signal matching device matching the first signal level to the second signal level and conversely.

The device enables the levels of the vehicle data transmission device and of the communication network data transmission device to be matched. Since this only requires power amplifiers and passive components for level matching, the device can be implemented by means of simple means. In addition, a continuous information chain according to ISO 15118 can be implemented. The vehicle data transmission can be linked directly to a network which meets the standard of the communication network data transmission device. The intermediate step, described initially, of a router or bridge and two modems in the charging station is not necessary.

The data transmission device of the charging station can comprise a transmitting branch and a receiving branch which are in each case coupled with a coil of the first coupling transformer. The first coupling transformer can be a conventional PLC modem.

The data transmission device of the vehicle can be connected directly to one of the coils of the first coupling transformer. The first coupling transformer thus combines the lines of the transmitting and of the receiving branch and the lines for the communication with the vehicle data transmission device. This arrangement thus corresponds to the standard arrangement of a PLC modem.

The signal matching device can comprise a second coupling transformer which is coupled via a damping device with one of the coils of the first coupling transformer, the data transmission device of the communication network being coupled to a coil of the second coupling transformer. By this means, signals from the communication network data transmission device can be transmitted to the vehicle data transmission device, the signals being matched in their level via the signal matching device. Signals can be transmitted from the vehicle data transmission device to the communication network data transmission device, the signals being matched in their level via the signal matching device of the charging station.

The transmitting branch of the data transmission device of the charging station can be coupled with a further coil of the second coupling transformer via an amplifier, the amplifier, the second coupling transformer and the damping device forming a first signal branch between the data transmission device of the charging station and the first coupling transformer, and, between the data transmission device of the charging station and the second coupling transformer, a second signal branch being provided which couples a signal, having the opposite phase to the signal via the first signal branch, into the first coupling transformer. This allows interference effects to be compensated for.

The second level matching branch can comprise an amplifier, a third coupling transformer and a damping device, the phase rotation being effected by rotating the direction of coupling-in at one of the coils of the first coupling transformer. Due to the rotating of the coupling-in direction, the compensation by means of phase rotation of 180° can take place without additional components.

The components of the first and of the second level matching branch can be of identical construction. This allows interference effects to be compensated for reliably.

The amplifiers of the first and of the second level matching branch can be designed to amplify linearly in a predetermined frequency range by means of which the desired level matching can be achieved in a communication from the vehicle data transmission device to the communication network data transmission device.

The second signal level is higher than the first signal level. This means that a communication based on the first communication protocol of the vehicle data transmission takes place with a first, lower signal level than a communication based on the second communication protocol of the communication network data transmission device. The difference in level can be between −10 dB and −26 dB and especially −16 dB.

The first communication protocol and the second communication protocol can be based on a power line communication. For example, the first communication protocol can be Homeplug AV. The second communication protocol can be, e.g., Homeplug GreenPHY.

In summary, it is proposed to interconnect a signal matching device as a "bridge" between an HPGP network which is used for the communication to the vehicle and an HPAV network which is used for the communication to a communication network (such as, e.g., the Internet). By providing a plurality of conventional PLC modems according to the HPAV standard, the signal levels of the different networks can be matched and interference effects compensated for. This only requires power amplifiers and passive components for level matching and level compensation. The communication to the vehicle can take place seamlessly without an intermediate step via the PLC modems according to the HPAV standard. Requirements for EMC can be met separately for the HPGP and the HPAV network.

In the text which follows, the invention will be explained in greater detail by means of exemplary embodiments in the drawing, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
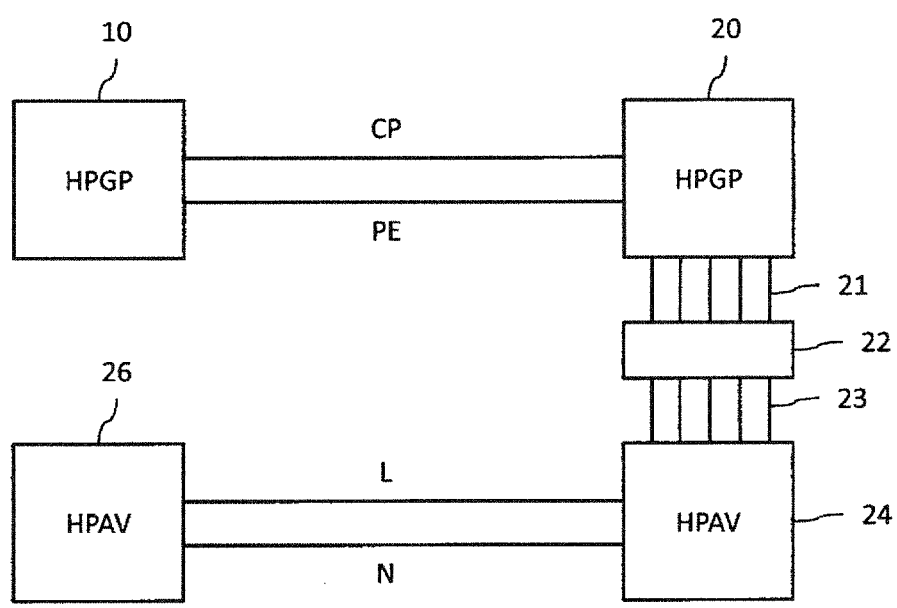
FIG. 1 shows a diagrammatic representation of a conventional device for transmitting data between a data transmission device of a vehicle and a data transmission device of a communication network as part of a charging process of an electrical energy store of the vehicle.

FIG. 1 shows a diagrammatic representation of a conventional device for transmitting data between a data transmission device 10 of a vehicle (also called vehicle data transmission device 10 in this description) and a data transmission device 26 of a communication network (also called communication network data transmission device 26 in this description). Communication between these components takes place, e.g., as part of a charging process of an electrical energy store of the vehicle. The vehicle, its energy store and other components connected to the communication network data transmission device 26 are not shown.

The vehicle data transmission device 10 represents a modem of an HPGP network and the communication network data transmission device 26 represents a modem of an HPAV network. The vehicle data transmission device 10 is connected by means of a signal line CP (control pilot) and a return line PE (protective earth) to a first data transmission device 20 of a charging station according to the HPGP standard. The first data transmission device 20 is designed as an HPGP modem which provides for communication with the vehicle data transmission device 10. The communication network data transmission device 26 is connected to a second data transmission device 24 of the charging station by means of two power lines L and N according to the HPAV standard, L being a conductor and N being a neutral conductor. The second data transmission device 24 is designed as an HPAV modem which provides for communication with the communication network data transmission device 26.

Communication according to HPGP takes place, e.g., with a signal level lower by −16 dB than the communication according to HPAV. In order to provide for communication between the data transmission devices 20, 24 of the charging column in the previous case according to FIG. 1, the data transmission devices 20, 24 of the charging column are logically coupled by means of a signal converter 22. The signal converter is a logical and physical converter, e.g. in the form of a gateway, a router, a bridge or a signal converter which decodes the signals of HPAV and recodes them as logical, digital signals into HPGP and correspondingly converts them. This also takes place in the opposite direction from HPAV to HPGP via the detour of a digital intermediate step. The signal converter 22 is connected via lines 21 to the data transmission device 20 and via lines 23 to the data transmission device 24. Accordingly, two complete modems and their logical coupling and control are needed in FIG. 1.

Figure 2:
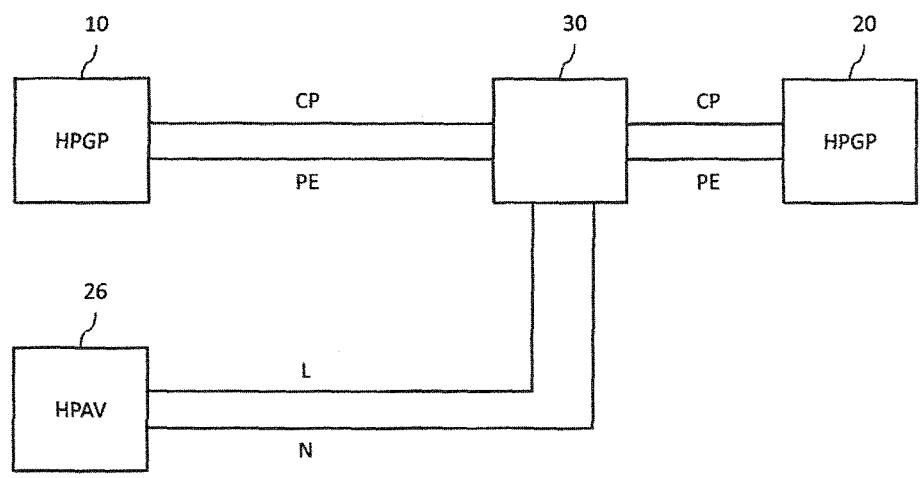
FIG. 2 shows a diagrammatic representation of a device according to the invention for transmitting data between a data transmission device of a vehicle and a data transmission device of a communication network as part of a charging process of an electrical energy store of the vehicle.
Figure 3:
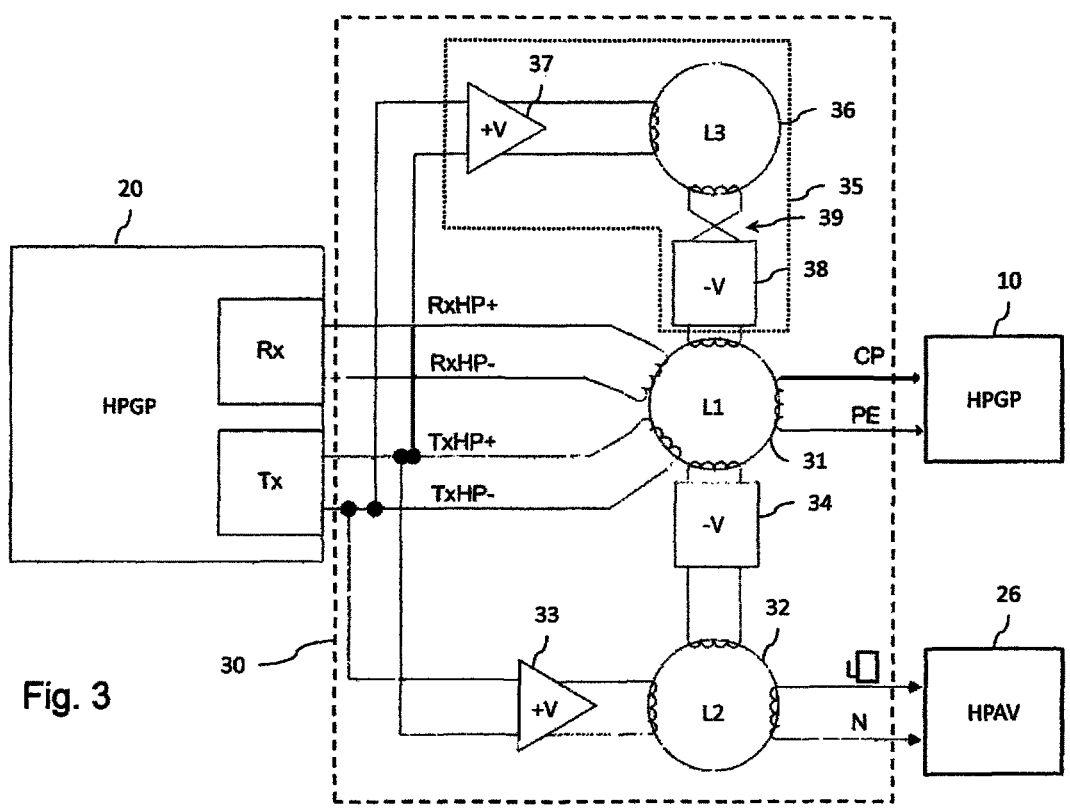
FIG. 3 shows a diagrammatic representation of a signal matching device used in accordance with the invention.

In contrast, the device according to the invention avoids such a conversion which entails the additional expenditure of two modems (data transmission devices 20, 24) in the charging column. FIG. 2 shows a diagrammatic representation of the device according to the invention which, instead of the data transmission devices 20, 24 and the signal converter 22 of the charging column, comprises a signal matching device 30. FIG. 3 shows a possible embodiment of the signal matching device 30 in the form of a repeater.

As can be seen in the diagrammatic representation of FIG. 2, the signal matching device 30 is connected to the communication network data transmission device 26 via lines L and N and to the vehicle data transmission device 26 via lines CP and PE. A data transmission device 20, designed as an HPGP modem, of the charging column is also connected to the signal matching device 30 via a signal line CP (control pilot) and a return line PE (protective earth).

As can be seen from FIG. 3, the data transmission device 20 of the charging column comprises technically required, different outputs for a transmitting branch (Tx) and a receiving branch (Rx). The data transmission device 20 in the form of the HPGP modem is designed to work also with a power system of very low impedance as a transmission medium. The output impedances of the transmitting or Tx stage are therefore low and are within the range of from 2 to 15 ohms.

These two outputs for the transmitting branch (Tx) and the receiving branch (Rx) are connected (as in the normal application) via transmitting lines TxHP+, TxHP− and receiving lines RxHP+, RxHP− to associated coils of a first coupling transformer 31 (L1). The first coupling transformer 31 combines lines RxHP+, RxHP−, TxHP+, TxHP− and lines CP and PE which are connected via an associated coil. Lines CP, PE are connected to the vehicle data transmission device 10. This arrangement corresponds to the standard arrangement of a PLC modem.

In order to couple in signals from lines L, N of the communication network data transmission device 26, a second coupling transformer 32 (L2) is provided in the signal matching device. On the receiving path, which is characterized by communication from the communication network data transmission device 26 to the vehicle data transmission device 10 and 20, a damping device 34 is arranged between the first and second coupling transformer 31, 32 which attenuates the high signal level of the HPAV network to the low signal level of the HPGP network by an amount "−V". This attenuation can be between −10 dB and −26 dB depending on design. In the example of the conventional device selected above it is −16 dB. The damping device is connected to respective coils of the first and the second coupling transformer 31, 32. As a result, the signal of the communication network data transmission device 26 on the signal path CP is thus available with the correct level. At the same time, this signal is also available on the receiving lines RxHP+, RxHP−, the data transmission device 20 also receiving this signal. In HPAV, as also HPGP, the addressees are logically coded and can be addressed either singly (uni-cast) or in groups (multi-cast, broad-cast). In PLC methods, these methods are analogous to other IP-based network technologies such as, e.g., Ethernet.

A further coil of the first coupling transformer 31 is connected to a device 35 for balancing (called balancing device 35 in the description), the operation of which is explained further below. The balancing device 35 comprises a third coupling transformer 36 (L3), an amplifier 37 and a damping device 38. Due to the directional effect of the amplifier 37 of the balancing device 35, the signal, also coupled into the further coil of the first coupling transformer 31, of the communication network data transmission device 26 remains without further effect in this signal branch, however.

A transmitting path of the vehicle data transmission device 10, which is identified by communication from the vehicle data transmission device 10 to the communication network data transmission device 26, runs via line CP to the first coupling transformer 31 and from there into signal lines RxHP, TxHP of the data transmission device 20. The signal is amplified via signal line TxHP and also via an amplifier 33 which is connected between the transmitting lines TxHP+, TxHP− and a coil of the second coupling transformer 32, the power is raised and also fed via the second coupling transformer 32 into lines L and N, as a result of which the communication network data transmission device 26 can receive the signal. Due to the coupling of the second coupling transformer 32 with the first coupling transformer 31, feeding into lines L and N has the consequence that the signal is fed into line CP again via the damping device 34. If a significant difference in time should arise due to propagation times, the vehicle data transmission device 10 would receive its own data again with a time delay. This would result in an undesirable feedback effect by which the signals, and thus the communication, would be greatly corrupted. Under disadvantageous circumstances, the signal chain can resonate up to a saturation effect.

To prevent this effect, the signal coupled in via the signal branch consisting of the amplifier 33, the second coupling transformer 32 and the damping device 34 is coupled into the first coupling transformer 31 in opposite phase via the balancing device 35. This compensates for the feeding in of the signal, not desired in the first coupling transformer 31, via the second coupling transformer 32. The reaction of the second coupling transformer 32 via the damping device 34 is thus no longer effective at the output of the first coupling transformer 31, i.e. the lines RxHP+, RxHP− and also CP.

For this purpose, the amplifier 37 of the balancing device 35 is connected with its inputs, like the amplifier 33, to the transmitting lines TxHP+, TxHP−. The outputs of the amplifier 37 are connected to a coil of the third coupling transformer 36. For coupling into the first coupling transformer 31 in opposite phase, a coil of the third coupling transformer 36 is connected rotated to the inputs of the damping device 38, which third coupling transformer, in turn, is coupled into the first coupling transformer 31 via a coil. The rotation is marked by the reference symbol 39. The gain of the amplifier 37 corresponds to the gain of the amplifier 33. The attenuation of the damping device 38 is "−V" as in the damping device 38.

The third coupling transformer 36, the amplifier 37 and the damping device 38 are ideally of identical construction and even identical with the coupling transformer 32, the amplifier 33 and the damping device 34. Amplifiers 33, 37 are used as power drivers which can amplify the needed frequency range linearly with the corresponding power. The damping devices 34 and 38 are purely passive and can be created, e.g., from resistors.

The phase rotation of 180° of the balancing device 35 is achieved by rotating the direction of coupling-in at the first coupling transformer 31.

The coupling transformers 31, 32, 36 can be designed corresponding to the coupling transformers used today in PLC technology. In the case of the first coupling transformer 31, no special requirements with respect to insulation are necessary. In the case of coupling transformers 32 and 36, the requirements with respect to the required mains isolation and insulation must be met.

This design ensures that a required wideband synchronism of the signals occurs and the signals from the second coupling transformer 32 can be deleted in the first coupling transformer 31.

Thus, HPGP can be used for ISO 15118 in a method which, in principle, is compatible and interoperable with HPAV and thus with an efficient PLC standard for Internet connection and can achieve a relatively high bandwidth of up to 10 MBd. This is compared with the desired application of another line as the power system and a distinctly reduced level arrangement. The level matching proposed, however, provides for bidirectional communication without needing the detour via complete implementation of the two methods. The compatibility mechanisms of both Homeplug Standards HPGP and HPAV are utilized for mutual communication.

LIST OF REFERENCE DESIGNATIONS

10 Data transmission device of a vehicle
20 First data transmission device of a charging station
21 Group of lines
22 Signal converter (router/bridge/gateway)
23 Group of lines
24 First data transmission device of the charging station
26 Data transmission device of a communication network (Internet)
30 Signal matching device
31 First coupling transformer
32 Second coupling transformer
33 Amplifying device
34 Damping device
35 Device for balancing
36 Third coupling transformer
37 Amplifying device
38 Damping device
39 Phase rotation
PE Return line
CP Signal line
L Signal line
N Return line
L1 PLC modem
L2 PLC modem
L3 PLC modem
Rx Output for receiving branch
Tx Output for transmitting branch
RxHP+ Receiving line
RxHP− Receiving line
TxHP+ Transmitting line
TxHP− Transmitting line The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for transmitting data between a data transmission device of a vehicle and a data transmission device of a communication network as part of a charging process of an electrical energy store of the vehicle, wherein the vehicle data transmission device is based on a first communication protocol having a first signal level, and the communication network data transmission device is based on a second communication protocol having a second signal level, wherein the device comprises a signal matching device with at least a first coupling transformer which, via at least one coil, couples a data transmission device of a charging station with the data transmission devices of the vehicle and of the communication network with one another, wherein the signal matching device is configured to match the first signal level to the second signal level and conversely to match the second signal level to the first signal level.

2. The device as claimed in claim 1, wherein the data transmission device of the charging station comprises a transmitting branch and a receiving branch which are each coupled with the at least one coil of the first coupling transformer.

3. The device as claimed in claim 1, in which the data transmission device of the vehicle is connected directly to one of the at least one coils of the first coupling transformer.

4. The device as claimed in claim 2, in which the data transmission device of the vehicle is connected directly to one of the at least one coils of the first coupling transformer.

5. The device as claimed in claim 1, in which the signal matching device comprises a second coupling transformer which is coupled via a damping device with one of the at least one coils of the first coupling transformer, wherein the data transmission device of the communication network is coupled with a coil of the second coupling transformer.

6. The device as claimed in claim 2, in which the signal matching device comprises a second coupling transformer which is coupled via a damping device with one of the at least one coils of the first coupling transformer, wherein the data transmission device of the communication network is coupled with a coil of the second coupling transformer.

7. The device as claimed in claim 3, in which the signal matching device comprises a second coupling transformer which is coupled via a damping device with one of the at least one coils of the first coupling transformer, wherein the data transmission device of the communication network is coupled with a coil of the second coupling transformer.

8. The device as claimed in claim 5, wherein the data transmission device of the charging station comprises a transmitting branch, in which the transmitting branch of the data transmission device of the charging station is coupled with a further coil of the second coupling transformer via an amplifier, wherein the amplifier, the second coupling transformer and the damping device form a first signal branch between the data transmission device of the charging station and the first coupling transformer, and wherein between the data transmission device of the charging station and the second coupling transformer, a second signal branch is provided which couples into the first coupling transformer in an opposite phase with respect to the first signal branch.

9. The device as claimed in claim 6, wherein the transmitting branch of the data transmission device of the charging station is coupled with a further coil of the second coupling transformer via an amplifier, wherein the amplifier, the second coupling transformer and the damping device form a first signal branch between the data transmission device of the charging station and the first coupling transformer, and wherein between the data transmission device of the charging station and the second coupling transformer, a second signal branch is provided which couples into the first coupling transformer in an opposite phase with respect to the first signal branch.

10. The device as claimed in claim 7, wherein the transmitting branch of the data transmission device of the charging station is coupled with a further coil of the second coupling transformer via an amplifier, wherein the amplifier, the second coupling transformer and the damping device form a first signal branch between the data transmission device of the charging station and the first coupling transformer, and wherein between the data transmission device of the charging station and the second coupling transformer, a second signal branch is provided which couples into the first coupling transformer in an opposite phase with respect to the first signal branch.

11. The device as claimed in claim 8, in which the second level matching branch comprises an amplifier, a third coupling transformer and a damping device, wherein a phase rotation is effected by rotating a direction of coupling-in at one of the at least one coil of the first coupling transformer.

12. The device as claimed in claim 8, in which the components of the first level matching branch and of the second level matching branch are of identical construction.

13. The device as claimed in claim 8, wherein the amplifiers of the first and of the second level matching branch are configured to amplify linearly in a predetermined frequency range.

14. The device as claimed in claim 1, wherein the second signal level is higher than the first signal level.

15. The device as claimed in claim 1, wherein the first communication protocol and the second communication protocol are based on a power line communication.

16. The device as claimed in claim 1, wherein the first communication protocol is Homeplug AV.

17. The device as claimed in claim 1, wherein the second communication protocol is Homeplug GreenPHY.

* * * * *